Oct. 5, 1954

R. LAPSLEY 2,690,714

CONTROL MECHANISM

Filed Oct. 31, 1952

INVENTOR.
ROBERT LAPSLEY
BY
ATTYS.

Oct. 5, 1954

R. LAPSLEY 2,690,714

CONTROL MECHANISM

Filed Oct. 31, 1952

INVENTOR.
ROBERT LAPSLEY
BY
ATTYS.

Patented Oct. 5, 1954

2,690,714

UNITED STATES PATENT OFFICE 2,690,714

CONTROL MECHANISM

Robert Lapsley, Buchanan, Mich., assignor to Clark Equipment Company, Buchanan, Mich., a corporation of Michigan Application October 31, 1952, Serial No. 318,035

4 Claims. (Cl. 103—38)

My present invention relates generally to control mechanisms, and, more particularly, is directed to a displacement adjusting and pressure safety control mechanism for variable displacement fluid pumps.

It is an object of my present invention to provide a control mechanism whereby the displacement of a variable displacement fluid pump may be varied selectively.

It is another object of my present invention to provide a control mechanism which serves to actuate the displacement control plunger of a conventional variable displacement fluid pump whereby the displacement of the latter may be varied selectively.

It is a further object of my present invention to provide a control mechanism, as noted, wherein the displacement of the pump may be preselected within the capacity of the pump.

In the accomplishment of the above objects, I contemplate the provision of a control mechanism comprising a housing adapted to be secured to the housing of a conventional variable displacement fluid pump. Slidably mounted in the control housing is a piston which abuts the displacement control plunger of the pump. A slidable valve is mounted in the piston and has passageway means formed therein. In addition, fluid passageway means are formed in the piston and the control housing and have communication with the suction and discharge ports of the pump. The valve and passageway means are so arranged that through movement of the valve, the pump discharge port may be placed in communication with one or the other of the ends of the piston. As a result, the piston may be shifted relative to the control housing for effecting actuation of the pump displacement control plunger. Thus, a change in displacement of the pump is conditioned by movement of the valve, after which an actual change in displacement is automatically effected by movement of the piston.

It is a feature of my present invention that the valve is of an articulated construction so as to prevent deflection thereof that would cause binding during movement of the valve.

It is a still further object of my present invention to provide a control mechanism, as described, wherein a safety valve assembly is embodied for automatically returning the pump to a position of slightly greater than zero displacement, when the pressure of fluid at the discharge port thereof exceeds a predetermined value.

I propose, in the accomplishment of the last noted object, the provision of a pressure actuated safety valve which is associated with the pump discharge port and the control mechanism valve. When the pressure of the fluid at the discharge port of the pump exceeds the predetermined value, the safety valve is actuated permitting the fluid under pressure to act on the control valve for returning the latter, the piston, the displacement control plunger, and the pump to their normal positions wherein the displacement of the pump is slightly greater than zero.

Now, in order to acquaint those skilled in the art with the manner of constructing and using control mechanisms in accordance with the principles of my present invention, I shall describe in connection with the accompanying drawings, a preferred embodiment of my invention.

Figure 1:
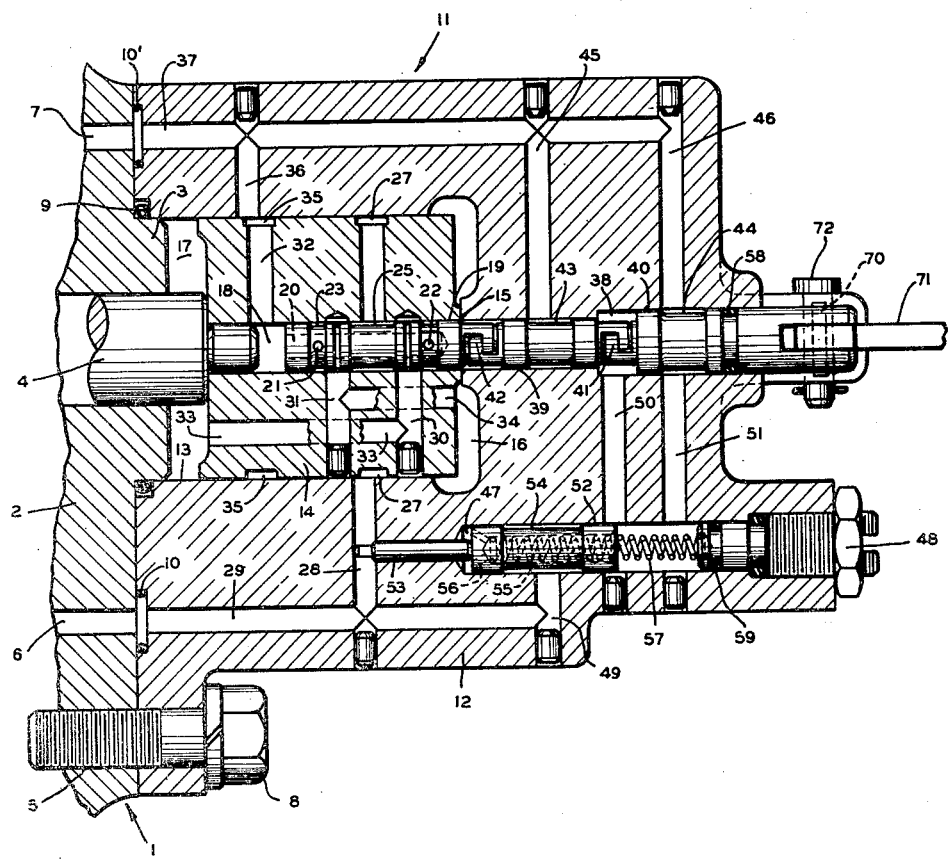
Figure 1 is a vertical sectional view of the pump displacement adjusting and pressure safety control mechanism of my present invention.

Referring now to the drawings, there is indicated generally by the reference numeral 1 a variable displacement fluid pump which comprises a housing 2 having an axially extending pilot portion 3. An axially extending pump displacement control plunger 4 is mounted for sliding movement in the housing 2, centrally of the pilot portion 3. Axial threaded openings 5, a fluid discharge port 6, and a fluid suction port 7 are also formed in the housing 2. The operation of the pump 1 is adapted to be regulated by means of the pump displacement adjusting and pressure safety control mechanism of my present invention, indicated generally by the reference numeral 11. The control mechanism 11 comprises a housing 12 which is secured to the pump housing 2 by bolts 8 threaded into openings 5. Suitable seals 9, 10 and 10' are provided about the pilot 3 and ports 6 and 7, between the housings 2 and 12, to prevent the leakage of fluid therepast.

A cylindrical opening 13 is formed in the control mechanism housing 12 and at one end fits about the pilot portion 3 for positively locating housing 12 relative to housing 2. Disposed in the cylinder 13 is a displacement regulating piston 14 which normally abuts a boss 15. Cylinder end chambers 16 and 17 are defined at the ends of the piston 14. In this position of the piston 14, the pump 1 is set a minimum displacement, i. e.

slightly greater than zero displacement. Since fluid is required to lubricate the moving elements of the pump 1 and to effect actuation of the displacement regulating piston 14, the displacement of the pump 1 is not, and cannot be, permitted to reach zero. The pump 1 must be so regulated that, under all conditions of operation, at least a small amount of fluid is delivered at the discharge port 6.

Movement of the piston 14 and plunger 4 to the left, as viewed in Figure 1, increases the displacement of the pump 1 and a corresponding return of the piston 14 and plunger 4 toward the right decreases the displacement of the pump 1. I shall now describe in detail the means by which movement of the piston 14 is effected.

A central axial opening 18 is formed in the piston 14 and disposed therein for sliding movement is a piston actuator slide valve 19. A central axial opening 20 is formed in the slide valve 19 which opening 20 communicates, through radial ports 21 and 22, with annular grooves 23 and 24 formed in the outer periphery of the valve 19. The valve 19 is also formed with an annular groove 25, centrally of the grooves 23 and 24, which communicates with a radial fluid passageway 26 formed in the piston 14. At the outer end of the passageway 26, an annular groove 27 is formed which communicates with a radial passageway 28 in the housing 12. The passageway 28 communicates with the pump pressure port 6 through a passageway 29.

Three additional radial fluid passageways 30, 31 and 32 are formed in the piston 14 and at their inner ends, communicate with opening 18. The passageways 30 and 31 communicate respectively with cylinder end chambers 16 and 17 through axial passageways 33 and 34. The passageway 32, at its outer periphery, communicates with an annular groove 35 formed in the piston 14. The groove 35 in turn communicates with a radial passageway 36 which intersects an axial passageway 37 communicating with pump suction port 7.

If it is desired to increase the displacement of the pump 1 from a minimum, the piston actuator slide valve 19 is moved to the left toward pump 1. As a result of such movement of the valve 19, fluid under pressure is delivered to the cylinder end chamber 16, from the pump pressure port 6, through passageways 29 and 28, groove 27, passageway 26, groove 25, and passageways 31 and 34. Simultaneously, cylinder end chamber 17 is placed in communication with the pump suction port 7 through passageways 37 and 36, groove 35, passageway 32, openings 18 and 20, port 22, groove 24, and passageways 30 and 33.

The fluid under pressure, entering the chamber 16, urges the piston 14 to the left thereby moving the plunger 4 to the left which increases the displacement of the pump 1. The piston 14 will move to the left until the passageways 30 and 31 are shifted out of alignment with the grooves 24 and 25.

If it is desired to decrease the displacement of the pump 1, the piston actuator slide valve 19 is moved to the right. As a result of such movement of valve 19, fluid under pressure is delivered to the cylinder end chamber 17, from the pump discharge port 6, through passageways 29 and 28, groove 27, passageway 26, groove 25, and passageways 30 and 33. Simultaneously, cylinder end chamber 16 is placed in communication with the pump suction port 7 through passageways 37 and 36, groove 35, passageway 32, openings 18 and 20, port 21, groove 23, and passageways 31 and 34.

The fluid under pressure, entering the chamber 17, urges the piston 14 to the right thereby permitting the plunger 4 to move to the right which decreases the displacement of the pump 1. The piston 14 will move to the right until the passageways 30 and 31 are shifted out of alignment with the grooves 25 and 23. It is to be understood from the foregoing description that the displacement of the pump 1 may be adjusted in an infinite number of steps, within the capacity of the pump, by suitably regulating the slide valve 19.

Axially aligned with the central opening 18 in the piston 14, and formed in the housing 12, is an opening 38 in which are disposed slide valves 39 and 40 interconnected articulatively at 41. The slide valve 39 is connected articulatively at 42 with the slide valve 19. Since the valves 19, 39, and 40 are interconnected articulatively, precise alignment of these valves is rendered unnecessary and the latter are balanced against fluid forces. The slide valve 39 is formed with an annular groove 43 and the slide valve 40 is formed with an annular groove 44. The opening 38 has communication with the passageway 37 through spaced radially extending passageways 45 and 46.

Ax axial opening 47 is formed in the housing 12 below the openings 18 and 38. The opening 47 at one end communicates with fluid passageway 28 and at its other end is closed by a closure and adjusting bolt and nut assembly 48. A radial passageway 49 connects the opening 47 with the passageway 29 and radial passageways 50 and 51 interconnect the openings 38 and 47 for a purpose to be hereinafter described in detail.

Disposed in the opening 47 is a safety valve 52 which has an axially extending nose portion 53 that projects into passageway 28. An annular groove 54 is formed in the valve 52 as is a central opening 55 which opens, through ports 56, into the opening 47 at the nose end 53 of valve 52. Extending into the opening 55 in valve 52 is a coil spring 57. The force exerted by the spring 57 may be varied by the adjusting means 48.

Now, with the elements of the pump displacement adjusting and pressure safety control mechanism 11 in the positions shown in Figure 1, fluid under pressure seeping past the valves 19 and 39 from the cylinder end chamber 16 is returned through groove 43 and passageways 45 and 37 to the pump suction port 7. The opening 38 is also placed in communication with the pump suction port 7 through passageways 50, pressure safety valve opening 47, passageway 51, groove 44, and passageways 46 and 37. By normally maintaining the opening 38 in communication with the pump suction port 7, free movement of the valves 19, 39 and 40 is permitted. In addition, fluid under pressure seeping past the nose portion 53 of safety valve 52 is returned to the pump suction port 7 through ports 56, opening 55, passageway 51, groove 44, and passageways 46 and 37. Since the safety valve opening 47 is normally in communication with the pump suction port 7, free movement of the valve 52 is permitted when line pressure exceeds a safe value. A suitable seal 58 is interposed between valve 40 and opening 38 for preventing oil leakage outwardly of housing 12. A similar seal 59 is interposed between safety valve 52 and opening 47 for preventing oil leakage outwardly of housing 12.

Let us suppose now that the pump 1 is set at maximum displacement and the pressure of the fluid delivered at the pump pressure port 6 exceeds a predetermined safe value. This pressure, flowing through passageways 29 and 28, will act on the nose end 53 of the safety valve 52 for urging the latter to the right against the force of spring 57. Upon movement of the valve 52 to the right, the opening 38 intermediate of the valves 39 and 40 is placed in communication with the pump pressure port 6 through passageway 50, groove 54 in valve 52, and passageways 49 and 29. This fluid under pressure serves to force the valve 40 to the right thereby returning it and the valves 19 and 39 to a position causing the displacement of the pump 1 to return to a minimum value. As the pressure of the fluid delivered at the pump pressure port 6 drops, the spring 57 will return the safety valve 52 to the position shown in Figure 1 and free movement of the actuating valves 19, 39 and 40 will again be permitted. The pressure at which the safety valve 52 will be actuated may be varied by adjusting the bolt and nut assembly 48.

Figure 2:
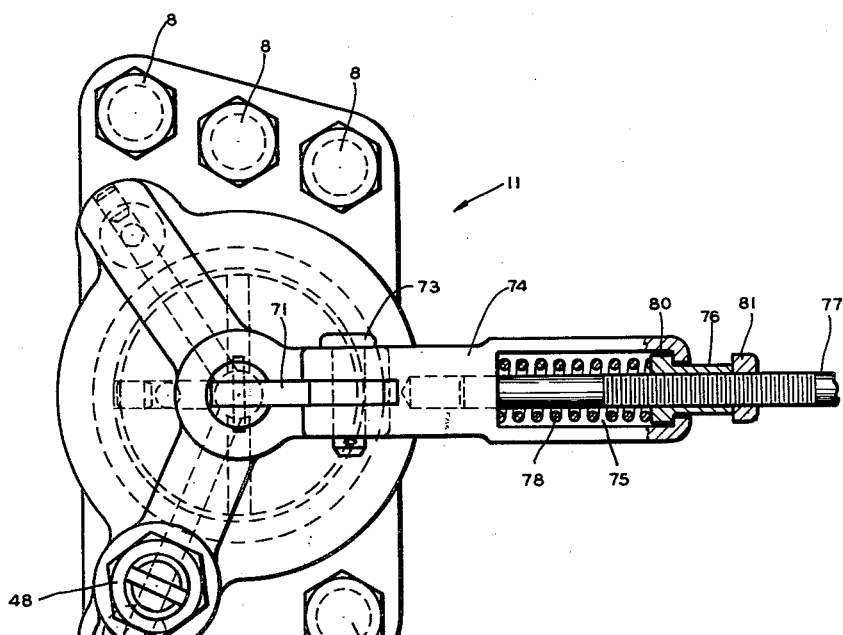
Figure 2 is an end elevational view of the control mechanism of Figure 1 with portions being broken away and shown in section.
Figure 3:
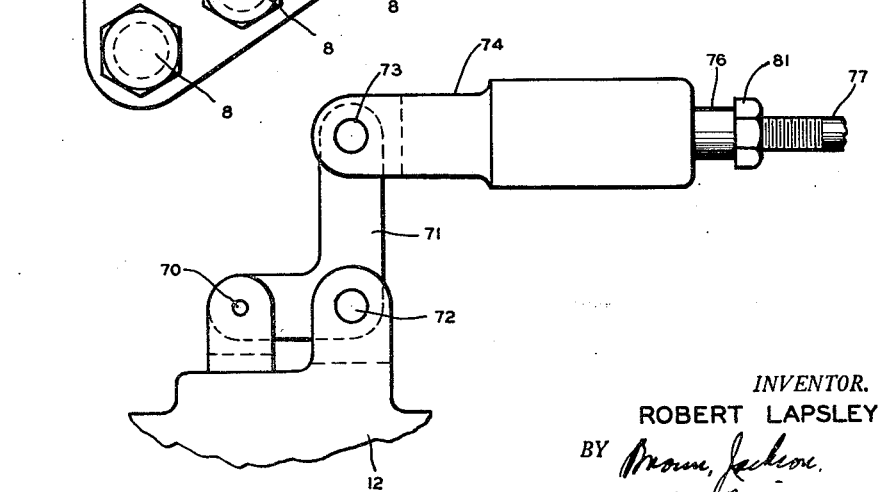
Figure 3 is a general horizontal view of a portion of the control mechanism shown in Figure 2.

The valve 40 has pivotally mounted to its outer end, by means of a pin 70, the one leg of a bell crank 71. The bell crank 71, at the junction of its legs, is pivotally mounted by means of a pin 72 to the housing 12. The other leg of the bell crank 71 has pivotally mounted thereto, by means of a pin 73, a frame member 74 which has an opening 75 formed therein. Mounted at the end of the frame member 74 for limited relative movement is a sleeve member 76 having an enlarged end head 80. The sleeve 76 is suitably secured to an actuator rod 77 and is maintained in position by means of a bolt 81. The sleeve member 76 may be adjusted lengthwise of the rod 77 and may be locked in any predetermined position by the nut 81. A spring 78 is disposed within the opening 75 in the frame member 74 and tends to normally maintain the sleeve member 76 in the position shown in Figure 2.

The aforedescribed mounting of the actuator rod 77 to the valve 40 permits the valve 40 to move to the right for returning the valves 19 and 39 to a position causing the displacement of the pump 1 to return to a minimum value, even though the actuator rod 77 may be held in a maximum displacement position, since the frame member 74 may move relative to the sleeve member 76 against the pressure of spring 78. At such time as the fluid pressure drops to a normal value and the safety valve 52 returns to the position shown in Figure 1, the spring 78 will cause the frame member 74 to return to the position shown in Figure 2, moving the pump elements again to a maximum displacement position.

Now, while I have shown and described what I believe to be a preferred embodiment of my present invention, it will be understood that various rearrangements and modifications may be made therein without departing from the spirit and scope of my present invention.

I claim:

1. For use with a variable displacement pump having a housing, suction and discharge ports, and a displacement control plunger, a control mechanism therefor comprising a housing secured to the pump housing, a piston opening formed in said control housing, a piston slidably mounted in said piston opening and having abutting engagement with the displacement control plunger, a valve opening formed in said piston, first passageway means formed in said control housing and communicating with the discharge port, second passageway means formed in said piston and communicating with said first passageway means, third passageway means formed in said piston and communicating with said valve opening and one end of said piston opening, fourth passageway means formed in said piston and communicating with said valve opening and the other end of said piston opening, a valve slidable in said valve opening, groove means formed in said valve, said valve when selectively actuated being adapted to increase the displacement of the pump by placing the discharge port in communication with the one end of said piston through said first and second passageway means, said groove means, and said third passageway means, and said valve when selectively actuated being adapted to decrease the displacement of the pump by placing the discharge port in communication with the other end of said piston through said first and second passageway means, said groove means, and said fourth passageway means.

2. For use with a variable displacement pump having a housing, suction and discharge ports, and a displacement control plunger, a control mechanism therefor comprising a housing secured to the pump housing, a piston opening formed in said control housing, a piston slidably mounted in said piston opening and having abutting engagement with the displacement control plunger, a valve opening formed in said piston, first passageway means formed in said control housing and communicating with the discharge port, second passageway means formed in said piston and communicating with said first passageway means, third passageway means formed in said piston and communicating with said valve opening and one end of said piston opening, fourth passageway means formed in said piston and communicating with said valve opening and the other end of said piston opening, fifth passageway means formed in said control housing and communicating with the suction port, sixth passageway means formed in said piston and communicating with said fifth passageway means, a valve slidable in said valve opening, groove means formed in said valve, seventh passageway means formed in said valve, said valve when selectively actuated being adapted to increase the displacement of the pump placing the discharge port in communication with the one end of said piston through said first and second passageway means, said groove means, and said third passageway means while simultaneously placing said suction port in communication with the other end of said piston through said fifth and sixth passageway means, said valve opening and said seventh and fourth passageway means, and said valve when selectively actuated being adapted to decrease the displacement of the pump by placing the discharge port in communication with the said other end of said piston through said first and second passageway means, said groove means, and said fourth passageway means while simultaneously placing said suction port in communication with the said one end of said piston through said fifth and sixth passageway means, said valve opening, and said seventh and third passageway means.

3. The combination of claim 2 wherein said valve is adapted to be positioned in any one of a plurality of positions whereby the displacement of the pump may be set at any predetermined point within the capacity of the pump, and wherein said piston moves in response to movement of said valve until communication is interrupted between said groove and both said third and fourth passageways.

4. The combination of claim 2 including a secondary safety valve opening formed in said control housing, eighth passageway means formed in said control housing and communicating with said valve and said secondary safety valve opening, ninth passageway means formed in said control housing and communicating with said secondary safety valve opening and said first passageway means, a secondary safety valve disposed in said secondary safety valve opening and projecting into said first passageway means, an annular groove formed in said safety valve, and the fluid under pressure acting on the end of said safety valve in said first passageway means causing said safety valve to shift when the discharge pressure increases above a predetermined value for effecting movement of said piston valve to a position causing a decrease in displacement of the pump by placing the discharge port in communication with said piston valve through said first and ninth passageway means, said safety valve groove, and said eighth passageway means.

References Cited in the file of this patent

UNITED STATES PATENTS

| Number | Name | Date |
|---|---|---|
| 2,280,190 | Ernst | Apr. 21, 1942 |
| 2,284,897 | Harrington | June 2, 1942 |
| 2,298,359 | Ernst | Oct. 13, 1942 |
| 2,471,860 | Brigham | May 31, 1949 |